UNITED STATES PATENT OFFICE.

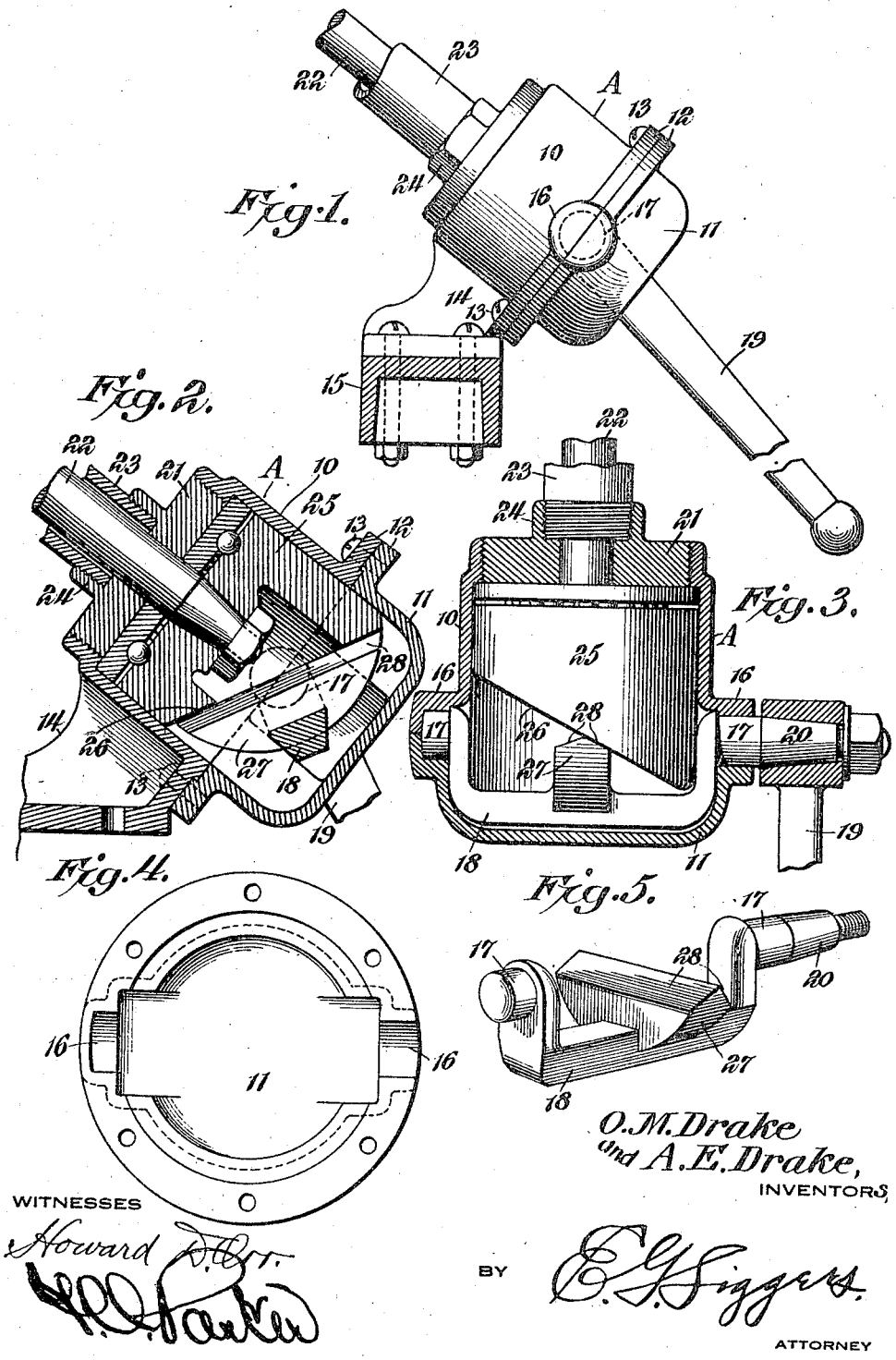

ORANGE MINOR DRAKE AND ALFRED EARL DRAKE, OF AMERICAN FALLS, IDAHO.

STEERING DEVICE.

1,290,126.     Specification of Letters Patent.     Patented Jan. 7, 1919.

Application filed July 31, 1917. Serial No. 183,815.

*To all whom it may concern:*

Be it known that we, ORANGE MINOR DRAKE and ALFRED EARL DRAKE, citizens of the United States, residing at American Falls, in the county of Power and State of Idaho, have invented a new and useful Steering Device, of which the following is a specification.

The invention relates to a steering device, and more particularly to the class of gearless steering mechanism for machinery, automobiles, motor boats, or the like.

The primary object of the invention is the provision of a device or mechanism of this character, wherein either oscillating or rotary motion can be converted into an osillatory movement without the use of toothed or friction gearing, and thereby avoiding lost motion or dead center and minimizing friction with resultant longevity to its parts, which are few in number, and simple in form and arrangement.

Another object of the invention is the provision of a device or mechanism of this character, wherein the same is easy of operation, and positive in its transmission of power.

A further object of the invention is the provision of a device or mechanism of this character, which is extremely simple in construction, thoroughly reliable and efficient in operation, possessing minimum parts and also inexpensive in manufacture and installation.

The invention will be best understood from a consideration of the following detail description, taken in connection with the accompanying drawing forming part of this specification, with the further understanding that the latter is not confined to any strict conformity with the showing of the drawing, but may be changed and modified as long as such changes and modifications come within the scope of the appended claims.

In the accompanying drawing:

Figure 1 is a side elevation of a steering device or mechanism with the upright steering shaft and column broken away and with a lever centrally broken away.

Fig. 2 is a central vertical sectional elevation.

Fig. 3 is a vertical transverse sectional view through the casing of the device or mechanism.

Fig. 4 is a plan view of the removable bottom section of the casing.

Fig. 5 is a perspective view of the oscillating stirrup.

Similar reference characters indicate like parts throughout the several figures.

In constructing a practical embodiment of the invention in accordance with the illustrated example, the casing A is provided, which is preferably formed with an upper cylindrical body section 10, and a lower cap or bottom section 11, which are detachably fastened and held together at the annular flanges 12 thereon by means of removable fasteners 13 engaged in said flanges. The body section 10 has a bracket 14, which is mounted to one of the cross beams or members 15 of an automobile frame. However, the casing can be otherwise supported and mounted.

Formed at the meeting flanged edges 12 of the sections 10 and 11 are diametrically opposed bearing bosses 16 for the trunnions 17 of an oscillating stirrup 18, one trunnion being extended for the fastening thereto of a lever 19, which at its lower or free end may be of any formation whereby it may be connected with the parts running to the wheels to be steered. The upper or opposite end of the lever is fastened to the reduced extension 20 of one of the trunnions in any suitable manner to be oscillated on the movement of the stirrup in a manner presently described.

Threaded in the upper open end of the cylindrical section 10 of the casing A is a disk-like nut 21 through which centrally passes the steering rod or shaft 22, which is projected through the steering column or post 23, as usual, and carries at its upper end the ordinary steering wheel, not shown. The column or post 23 is detachably threaded in the wrench engaging boss 24 of the nut 21 for the connecting of the same to the casing A for the steering mechanism hereinafter fully described.

Rotatably mounted within the casing A above the stirrup 18 therein is a cam head 25, which is detachably and securely fastened centrally thereof to the lower end of the steering rod or shaft 22, which is projected within the casing A. The cam head 25 is formed with an angular cam face 26, which works at the center of the transverse axis of the trunnion 17 for the stirrup 18, which is formed centrally thereof with a rocker 27 extending transversely of the axis of movement of said stirrup and is provided with reversely beveled contacting portions 28 for the cam surface 26 of the cam head 25 when actuated as is clearly shown in Fig. 3 of the drawing.

It will be noted that the inner or upper edge of the rocker, which extends on opposite sides of the stirrup, is in contact with the cam face of the cam head.

On either the oscillation or rotation of the cam head 25, the cam surface 26 thereof will play upon the rocker 27 at the beveled faces 28 thereof so as to cause the oscillation of the stirrup 18, which transfers such motion to the lever 19 for moving the same. The moving of the cam head 25 to the position shown in Figs. 2 and 3 of the drawing causes the shifting of the stirrup for effecting the oscillatory movement thereof, so that it will be seen that a slight oscillatory movement of the steering shaft or rod 22 from one side to the other will cause the oscillatory movement of the lever 19 for steering purposes. Now on complete rotation of the steering rod or shaft 22, said stirrup will be oscillated and likewise similar movement imparted to the lever 19 connected therewith.

From the foregoing, it is thought that the construction and manner of operation of the invention will be clearly understood, and, therefore, a more extended explanation has been omitted.

What is claimed is:—

1. In mechanism of the character described, a movable cam having an obliquely disposed cam surface, an oscillatably supported stirrup, and a rocker on said stirrup and disposed transversely of its axis of movement. and having a beveled edge in working relation to the cam surface of said cam.

2. In combination with a casing formed with an upper body section and a lower bottom section, and provided with bearings formed on the meeting edges of said sections, an oscillating stirrup within the casing and having trunnions mounted in said bearings, one of the trunnions being extended beyond one of the bearings, a cam head rotatably mounted within the casing above the stirrup and having an obliquely disposed cam face, a transverse rocker located at a point on the stirrup between the trunnions and having its inner edge in engagement with the cam face, whereby motion is transmitted from the cam head to the stirrup, and a lever connected to the extended trunnion.

3. In mechanism of the character described, a movable cam having an obliquely disposed cam surface, an oscillatably supported stirrup, a rocker on said stirrup and disposed transversely of its axis of movement, and having a beveled edge in working relation to the cam surface of said cam, an operating rod centrally connected to the cam, a casing receiving said cam and stirrup and having a removable bottom and an open top, and a closure removably fitted in the open top and surrounding the operating rod.

4. In mechanism of the character described, a movable cam having an obliquely disposed cam surface, an oscillatably supported stirrup, a rocker on said stirrup and disposed transversely of its axis of movement, and having a beveled edge in working relation to the cam surface of said cam, an operating rod centrally connected to the cam, a casing receiving said cam and stirrup and having a removable bottom and an open top, a closure removably fitted in the open top and surrounding the operating rod, and bearings formed on the meeting edges of the casing and its bottom at diametrically opposite points for said stirrup.

5. In mechanism of the character described, a movable cam having an obliquely disposed cam surface, an oscillatably supported stirrup, a rocker on said stirrup and disposed transversely of its axis of movement, and having a beveled edge in working relation to the cam surface of said cam, a lever operated by said stirrup, an operating rod centrally connected to the cam, a casing receiving said cam and stirrup and having a removable bottom and an open top, a closure removably fitted in the open top and surrounding the operating rod, bearings formed on the casing and its bottom at diametrically opposite points for said stirrup, an internally threaded boss formed on the closure member concentrically of the operating rod, and a column for said rod engaged in said boss.

6. In mechanism of the character described, a movable cam having an obliquely disposed cam surface, an oscillatably supported stirrup, a rocker on said stirrup and disposed transversely of its axis of movement, and having a beveled edge in working relation to the cam surface of said cam, a lever operated by said stirrup, an operating rod centrally connected to the cam, a casing receiving said cam and stirrup and having a removable bottom and an open top, a closure removably fitted in the open top and surrounding the operating rod, bearings formed on the casing and its bottom at diametrically opposite points for said stirrup, an internally threaded boss formed on the closure member concentrically of the operating rod, a column for said rod engaged in said boss, and trunnion portions formed on the stirrup and engaged in the bearings.

In testimony, that we claim the foregoing as our own, we have hereto affixed our signatures in the presence of two witnesses.

ORANGE MINOR DRAKE.
ALFRED EARL DRAKE.

Witnesses:
E. C. BOMAN,
C. H. DEA.

Copies of this patent may be obtained for five cents each, by addressing the "Commissioner of Patents, Washington, D. C."